US008345044B2

(12) United States Patent
Lin et al.

(10) Patent No.: US 8,345,044 B2
(45) Date of Patent: Jan. 1, 2013

(54) INDIRECT BINDING WITH SEGMENTED THIN LAYERS TO PROVIDE SHAPE-PRESERVING DEFORMATIONS IN COMPUTER ANIMATION

(75) Inventors: Chung-An Lin, Cerritos, CA (US); Gene S. Lee, Los Angeles, CA (US); Erick S. Miller, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 405 days.

(21) Appl. No.: 12/612,081

(22) Filed: Nov. 4, 2009

(65) Prior Publication Data

US 2010/0321386 A1    Dec. 23, 2010

Related U.S. Application Data

(60) Provisional application No. 61/187,859, filed on Jun. 17, 2009.

(51) Int. Cl.
*G06T 13/00* (2006.01)
(52) U.S. Cl. .................. 345/420; 345/473; 345/419
(58) Field of Classification Search .................. None
See application file for complete search history.

(56) References Cited

U.S. PATENT DOCUMENTS 6,573,892 B1 *  6/2003  Yang et al. ................. 345/421

OTHER PUBLICATIONS

Mean Value Coordinates for Closed Triangular Meshes, Ju et al., 2005.*
Automatic Rigging and Animation of 3D Characters, Baran et al., 2007.*
Mesh-Based Inverse Kinematics, Sumner et al., 2005.*
Harmonic Coordinates for Character Articulation, Joshi et al., 2007.*

* cited by examiner

*Primary Examiner* — Ulka Chauhan
*Assistant Examiner* — Phong Nguyen
(74) *Attorney, Agent, or Firm* — Marsh Fischmann & Breyfogle, LLP (57) ABSTRACT

A method for use in deformation of an object. The method includes providing a high-resolution model of the object and providing a control cage for the model that includes control faces each defined by control vertices. The method includes generating a thin-layer segment for each of the control faces including extruding a set of the control vertices a distance toward the model. The method includes binding the control cage to the high resolution model based on the thin-layer segments. Each of the thin-layer segments includes a segmented mesh corresponding to a set of the control faces surrounding each face as it is used as seed for a segment. The method includes determining heat diffusion weights for the segments and using the weights along with mean value coordinates to statically bind the cage to the model and to determine influences of segments during deformation of the model with the cage.

16 Claims, 9 Drawing Sheets

INDIRECT BINDING WITH SEGMENTED THIN LAYERS TO PROVIDE SHAPE-PRESERVING DEFORMATIONS IN COMPUTER ANIMATION

CROSS-REFERENCE TO RELATED APPLICATIONS

This application claims the benefit of U.S. Provisional Application No. 61/187,859 filed Jun. 17, 2009, which is incorporated herein by reference in its entirety.

BACKGROUND OF THE INVENTION

1. Field of the Invention

The present invention relates, in general, to computer graphic production of a three dimensional (3D) character or computer animation, and, more particularly, to computer methods, software, and systems for binding a control cage to an animation mesh (or 3D modeled object, high resolution geometry, or the like) to provide more desirable and/or realistic deformation when moving the character among positions including articulating a character's skin in an accurate manner during movement of the character represented by the animation mesh.

2. Relevant Background

Computer graphics is widely used to provide animation for movies, video games, and other applications and, recently, there have been rapid advances in the animation of three dimensional (3D) characters. One problem that continues to face animators and creators of high-end computer graphics applications is creating and controlling volume deformations that are used to articulate characters such as for use in computer generated feature films and other high-end applications where it is desirable to provide accurate character deformation as the character is moved from one position to another. For example, animation of 3D characters is often considered most effective when the deformations of the character's skin or body simulates real life deformations of similar characters.

To control 3D models or animation meshes of a character or object, there has been an increasing interest in using cages or control cages as a practical way to manipulate the animation mesh or high resolution geometry defined by numerous vertices. A control cage is generally a low polygon-count polyhedron that has a shape that is defined by an artist or animator to enclose a 3D model or animation mesh. The points inside the control cage may represent affine sums of the cage's vertices multiplied by special weights called coordinates. Manipulating the control cage with a computer via animation software or applications induces a relatively smooth space deformation of its interior space. Hence, the 3D model or animation mesh is bound to the cage to move with or in a defined or corresponding way based on movement of the control cage. Advantages of cage-based deformation techniques include their simplicity, flexibility, and speed. Manipulating an enclosed object, for example a mesh surface of a modeled item, involves a smaller computational cost (when compared with moving the original high resolution model) since transforming a point merely requires a linear combination of the control cage geometry using precalculated coordinates. Unfortunately, current space-deformation techniques have limitations regarding the preservation of shape and/or details of the underlying or bound animation mesh or high resolution 3D model.

With current deformation techniques, it is important to properly bind the control cage to the animation mesh or high resolution geometry defining the modeled item or object (e.g., a 3D character being animated). Advanced deformation techniques include a variety of cage-model binding techniques but each has limitations for computer graphics (CG) production users. For example, a binding technique has been developed that uses "green coordinates" for closed polyhedral cages, and the green coordinate binding technique uses coordinates that are derived from the theory of green functions to try to provide piecewise, smooth boundaries in any dimension such that the deformation operator does not require discretization. Techniques have been used to derive closed-form expressions for the coordinates/green coordinates to produce a relatively fast algorithm for cage-based space deformation. However, the use of green coordinates in binding may produce scaling artifacts, provides limited or no control over localized regions, and is often numerically unstable.

Another method for creating and controlling volume deformations that are used to articulate animated characters involves the use of harmonic coordinates. In these processes, deformations may again be controlled using a topologically flexible structure or control cage defined by a 3D mesh. The control cage is bound to the animation mesh or 3D model of the animated object by using harmonic coordinates that are generally barycentric coordinates that may be extended to any dimension, and harmonic coordinates are intended to provide the advantages of being non-negative even in strongly concave situations and of having their magnitudes fall off with distance as measured within the control cage. However, the use of harmonic coordinates may cause problems when they are used in binding points that are outside the control cage. Additionally, use of harmonic coordinates may be inaccurate unless they are used with a dense solver provided in or accessed by a CG or animation application, and dense solvers are typically very slow and/or require more processing capacity.

Mean value coordinate (MVC) techniques have also been utilized for binding a control cage to an animation mesh or for defining the correspondence of the cage with the original high resolution geometry of the modeled object. For example, one technique generalizes MVCs from closed two-dimensional (2D) polygons to closed triangular meshes as part of the binding process. MVC techniques are fast and often appealing for use with low resolution control cages. However, MVC-based binding processes may have a large computational footprint as resolution of the control cage is increased to support real-world or more typical CG applications. MVC binding techniques also may provide limited local controls and may require that a rebinding operation be performed when an incoming vertex of the deformed mesh is moving.

Other problems may arise with use of MVC and other binding techniques. For example, most existing binding techniques do not allow arbitrary control cages with open holes. Also, existing binding techniques typically require a special case or binding process that involves barycentric coordinates when a vertex of the animation mesh lies coplanar with a control cage face. Due to the existence of these and other issues with presently used binding practices, there remains a demand for improved methods for allowing control cages to be bound to a 3D model or animation mesh to support accurate and/or shape-preserving deformation of the 3D model or animation mesh (e.g., appealing deformation of skin of an animated 3D character as it is articulated and the like).

SUMMARY OF THE INVENTION

The present invention addresses the above and other problems by providing a smooth, indirect binding method for use in providing static binding of a control cage to a high resolution 3D model or animation mesh (with "static binding" generally involving coordinates being computed at the binding time when a low resolution control cage and a high resolution model are in a so-called binding pose in contrast to "dynamic binding" that involves coordinates being computed at run time using the latest input model and a base control cage). The indirect binding or "iBind" method may be implemented in software such as part of an animation application or deformer module run by a graphics computer system and, generally, the indirect binding method begins by building thin-layer segments from a user-created control cage. Typically, such a segment is formed by providing a thin-layer (or segmented mesh) that is extruded from a seed control face in the control cage along with a number of surrounding/contacting control faces. For example, each control vertex of this set of control faces is extruded along the normals of the control cage inward toward the high resolution model, and the layer is set to a uniform or adaptive extrusion thickness (e.g., to encapsulate some or all model vertices controlled by the thin-layer segment). The forming of a thin-layer segment from each control face (e.g., each is treated as a seed face at one point in the process) results in a thin-layer, closed form geometric structure of such segments, which serves as a cage for storing and evaluating a structured set of four dimensional mean value coordinates (MVCs).

Influence weights for each thin-layer segment to a model vertex is achieved by performing surface-based, heat diffusion to the underlying animation mesh. Afterwards, the weights are normalized, and a structured set of MVCs of each vertex is computed for each non-zero influencing thin-layer segment. These MVC values are then blended between overlapping thin-layer segments according to the influence weights. In some embodiments, static binding is provided as part of the indirect binding method including performing a sampling of the MVC space of each thin-layer segment to support dynamic vertices. This extension of MVC binding techniques permits the vertices of the underlying mesh to freely change position without being dynamically rebound. In computer graphics production, when articulating character skin, dynamic rebinding is typically undesirable since it often rebinds vertices to unintended locations (such as lips being rebound to a nose during facial animation). Dynamic rebinding may also be supported in the indirect binding methods taught herein, but for many cases of character articulation, a static binding option may be utilized.

The static binding method used as part of the indirect binding or iBind application is stable and controllable due to its use, in some embodiments, of quadruple structured coordinates (QSCs). QSCs may be constructed using the original vertex and three additional coordinates sampled along each Cartesian axis. QSCs may be the MVCs stored for all four of these samples, which are then applied to build a non-singular matrix for transforming and deforming the dynamically changing vertices. In some cases, linear precision, smoothness, and interpolation of the iBind application are achieved based on the stability and behaviors of the mean value interpolant described in the following detailed description.

More particularly, a computer-implemented method is provided for use in animation or deformation of an object such as a 3D character. The method includes providing a 3D high-resolution model or animation mesh of the object in memory and also providing a control cage for the high resolution model (e.g., each of the model and cage may be generated by a computer operator via executing modules/code and/or received from other processes or systems). The control cage may include a plurality of control faces that are each defined by a number of control vertices. Then, with a microprocessor, the method may continue with generating a thin-layer segment for each of the control faces including extruding a set of the control vertices a distance toward the high resolution model. The method may also include with the microprocessor, binding the control cage to the high resolution model based on the generated thin-layer segments.

In some cases of the method, each of the thin-layer segments includes a segmented mesh corresponding to a set of the control faces contacting the control vertices of a seed one of the control faces. In the method, the extrusion distances may be set such that the thin-layer segments each encapsulate at least one vertex in a proximate portion of the high resolution model. In other cases of the method, the generating step may include the control vertices being extruded along a normal relative to an adjacent one of the control faces. The method may also include computing mean value coordinates (MVCs) for each of the thin-layer segments and then using the mean value coordinates to define the binding of the control cage to the high resolution model. Additionally, the method may include determining heat diffusion weights for each of thin-layer segments using a heat diffusion model process with heat sources positioned/located at central locations of the control faces of the control cage.

According to some aspects, the method may include manipulating the control cage to deform the high resolution model, wherein the deforming comprises repositioning at least a number of vertices of the high resolution model based on the heat diffusion weights and the mean value coordinates for the thin-layer segments. Also, in the method, the binding may include defining a quadruple structure coordinate for the high resolution model and using the heat diffusion weights and the quadruple structure coordinates to deform the high resolution model in response to a manipulation of the control cage.

DETAILED DESCRIPTION OF THE PREFERRED EMBODIMENTS

The following description is generally directed toward a computer-based method of providing smooth indirect binding of a control cage to a 3D model using segmented thin-layers. The 3D model may be an animation mesh or high resolution geometry representing a character or other object being animated including manipulation that causes portions to undergo deformation in a desired manner. The binding technique may also be labeled "iBind" in this discussion and provides a novel, indirect binding technique that provides improvements over the conventional use of mean value coordinates (MVCs) in binding of a control cage to an animation mesh.

The following discussion begins with an overview of computer systems and methods for implementing the indirect binding technique and then progresses to more specific description of various steps or subprocesses of the indirect binding technique including specific examples of its application. From the following description, it will become clear that embodiments of the indirect binding smoothly deform vertices of an animation mesh or 3D model using a control cage. The binding technique leverages heat diffusion in a unique manner on closed, segmented thin-layers (which are extruded or formed from the cage control faces) across a structured set of MVCs. Use of iBind produces fast, stable, and visually/artistically appealing special deformation.

Figure 1:
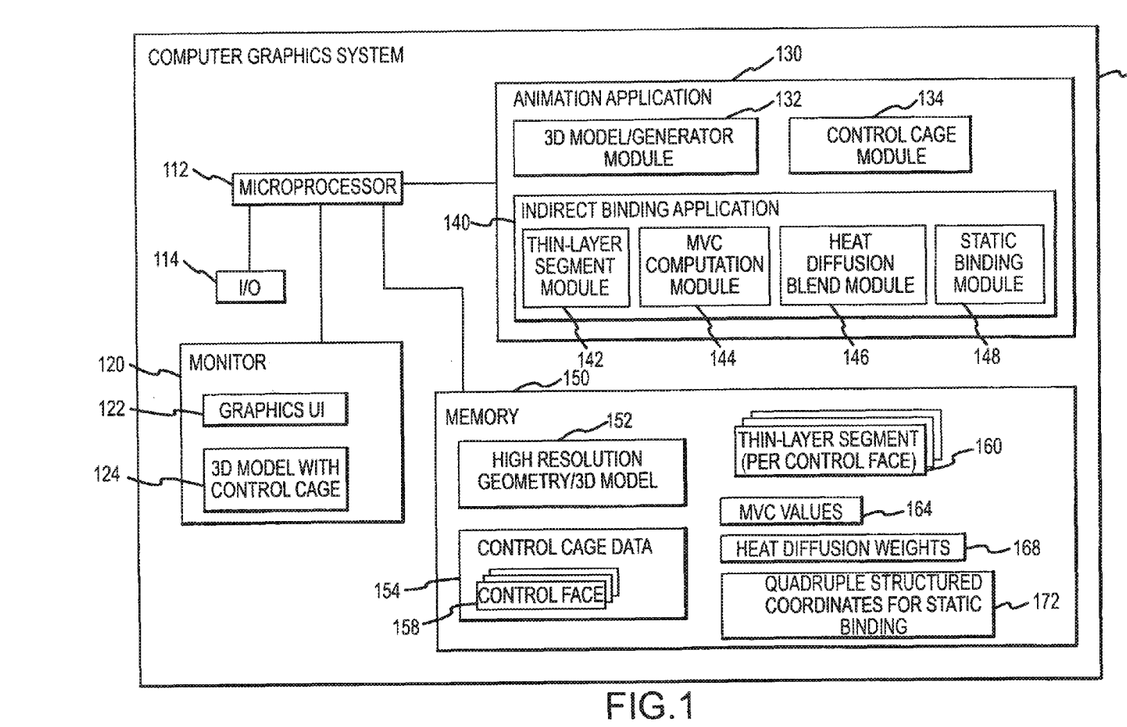
FIG. 1 is a functional block drawing of a computer system or computer graphics system that may be used to implement binding techniques described herein along with manipulation of a high resolution geometry or 3D model with a control cage after binding.

The method may be implemented using a computer graphics system 110 as shown in FIG. 1. The system 110 may take the form of any well known or yet to be developed computer device with a microprocessor 112 running or executing code/program modules as shown with animation application 130 to provide the functionality (such as indirect binding techniques/processes) described herein.

For example, and as a brief overview, the system 110 may be operated to provide a method that includes receiving an animation mesh/3D model representing a character and/or an object to be animated by the system 110 (or other systems). The method may include building a control cage (or receiving such a cage) that is associated with the animation mesh, and then building segmented thin layers comprising a plurality of segments from the control cages (e.g., a thin-layer segment for each control face of the cage). The control cage may include a plurality of faces, and the act/step of building the segmented thin layers may include generating an extruded mesh segment that expands at least one face of the control cage by a number (n) of surrounding faces. The vertices of the thin layer may be extruded along normals of the control cage at a predefined or user-selectable/adjustable thickness (t). The segmented thin layer may include a plurality of segments in which each segment is a closed form geometric structure. The method may also include determining and storing a structured set of four MVCs associated with at least one thin-layer segment. The method may also include determining an influence weight between the animation mesh and the segmented thin layer using a surface-based heat diffusion model by assigning a heat diffusion coefficient to the segmented thin layer.

To perform such a method, the system 110 may be thought of as including an editor or animation application 130 that is operable to modify a first animation mesh (or mesh sequence) into a second animation mesh (or mesh sequence) (with both shown at 152 as a high resolution geometry/3D model) such as via cage manipulations to deform a represented character or object. The system 110 may include memory or memory structures 150 that hold or store a representation of a control cage 154 surrounding the animation mesh 152, with the control cage 154 including a plurality of control faces 158. The system 110 may also include memory structures 150 holding/storing a representation of a segmented thin layer including a plurality of segments 160, and each segment 160 of the segmented thin layer may be associated with a face 158 of the control cage 154. The memory structure 150 may also hold or store a representation of a segmented thin layer that is adapted based on or bound, in part, based on a set of MVCs 164 for the segments 160.

Referring again to FIG. 1, the system 110 includes a CPU or microprocessor 112 that manages or runs input/output (I/O) devices 114 such as keyboards, touchscreen/pads, a mouse, voice controls, printers, and the like that allow an operator (e.g., an artist, animator, or the like) to enter data into and to receive data out from the system. The system 110 also includes a monitor(s) 120 that is used to display a graphics user interface (UI) 122 along with images 124 of a 3D model/animation mesh along with a control cage (that may be extruded to provide segmented thin layers).

The system 110 includes an animation application 130 that is run by the microprocessor 112 to provide the indirect binding processes described herein and also to allow an operator to provide an animation mesh/3D model, to generate or provide a control cage, and to manipulate the control cage after it is bound to the animation mesh to deform the animation mesh (create a second animation mesh from a first animation mesh by moving the character/object being modeled/animated from a first to the second position, for example). The animation application 130 may include a 3D model generator module 132 for creating an animation mesh or high resolution model 152 that is stored in memory 150. The application 130 may also include a control cage module 134 for generating or defining (based on user/operator input via I/O devices 114) a control cage 154 with a plurality of faces 158 that is also stored in memory 150.

The animation application 130 may also include or access/call an indirect binding application/module 140. This set of code or program may be executed by the microprocessor 112 to provide many of the binding functions taught herein. For example, the binding application or iBind 140 may include a thin-layer segment module 142 for generating a thin-layer segment 160 (or set of thin-layer segments) for each control face 158 of the control cage 154 (which, in turn, may be defined by a set of control vertices, set of control edges, and control faces 158). The binding application 140 may also include an MVC computation module 144 that is operable to determine MVC values 164 for or on all the segments 160. Further, the binding application 140 includes a heat diffusion blend module 146 that functions to compute heat diffusion weights 168 for each portion/segment of a segmented thin-layer 160. Additionally, the binding application 140 may include a static binding module 148 that functions to provide a static binding of the control cage 154 to the high resolution geometry/3D model 152, in part, by determining quadruple structured coordinates 172 using the previously determined data/information including the thin-layers 160, the MVC values 164, and the heat diffusion weights 168, as is explained in detail below.

Figure 2:
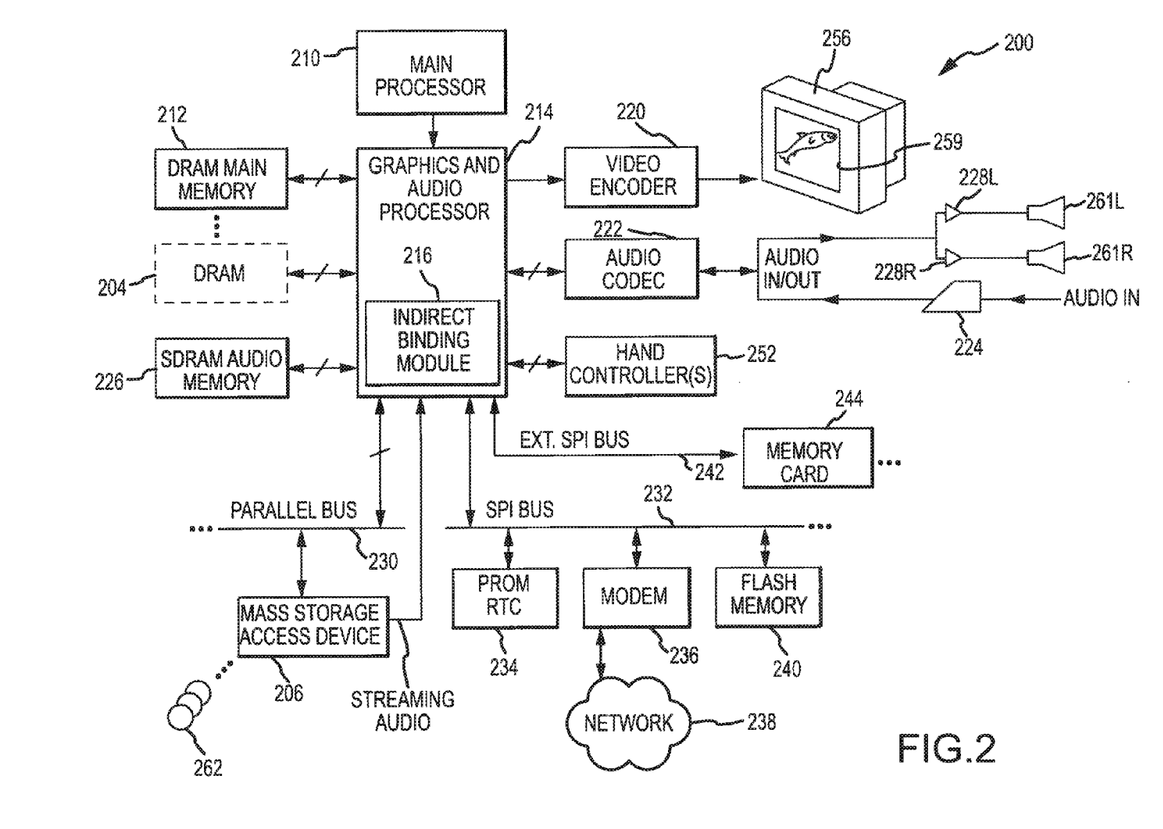
FIG. 2 provides a more detailed block drawing of a computer-based system for implementing the binding technique described herein to facilitate deformation of a high resolution 3D model or animation mesh with a corresponding or bound control cage.

FIG. 2 shows a block diagram of example components of system 200 that may be used to provide computer animation with the described binding techniques. The primary components include: a main processor (CPU) 210, a main memory 212, and a graphics and audio processor 214 that includes an indirect binding module 216 configured to perform the indirect binding functions described herein (e.g., extruding faces of a control cage to create segmented thin layers for each control face of the cage, determining MVCs for the control faces, determining heat diffusion weights, and performing static binding using this information and quadruple structured coordinates).

In the system 200, main processor 210 receives inputs from handheld controllers 252 and/or other input devices via graphics and audio processor 214. Main processor 210 interactively responds to user inputs, and executes an animation application, a deformer, or other program supplied, for example, by external storage media 262 via a mass storage access device 206 such as an optical disk drive or the like. In this example, main processor 210 generates 3D graphics and audio commands and sends them to graphics and audio processor 214. The graphics and audio processor 214 processes these commands to generate visual images or computer animation with indirect binding according to described embodiments on display 259 and sound on speakers 261R, 261L or other suitable sound-generating devices. Example system 200 includes a video encoder 220 that receives image signals from graphics and audio processor 214 and converts the image signals into analog and/or digital video signals suitable for display on a standard display device such as a computer monitor or home color television set 256.

System 200 also includes an audio codec (compressor/decompressor) 222 that compresses and decompresses digitized audio signals and may also convert between digital and analog audio signaling formats as needed. Audio codec 222 can receive audio inputs via a buffer 224 and provide them to graphics and audio processor 214 for processing (e.g., mixing with other audio signals the processor generates and/or receives via a streaming audio output of mass storage access device 206). Graphics and audio processor 214 may store audio related information in an audio memory 226 that is available for audio tasks. Graphics and audio processor 214 provides the resulting audio output signals to audio codec 222 for decompression and conversion to analog signals (e.g., via buffer amplifiers 228L, 228R) so they can be reproduced by speakers 261L, 261R.

Graphics and audio processor 214 has the ability to communicate with various additional devices that may be present within system 200. For example, a parallel digital bus 230 may be used to communicate with mass storage access device 206 and/or other components. A serial peripheral bus 232 may communicate with a variety of peripheral or other devices including, for example, a programmable read-only memory and/or real time clock 234, a modem 236 or other networking interface (which may in turn connect system 200 to a telecommunications network 238 such as the Internet or other digital network from/to which program instructions and/or data can be downloaded or uploaded), and flash memory 240. A further external serial bus 242 may be used to communicate with additional expansion memory 244 (e.g., a memory card) or other devices. Connectors may be used to connect various devices to busses 230, 232, 242.

Figure 3:
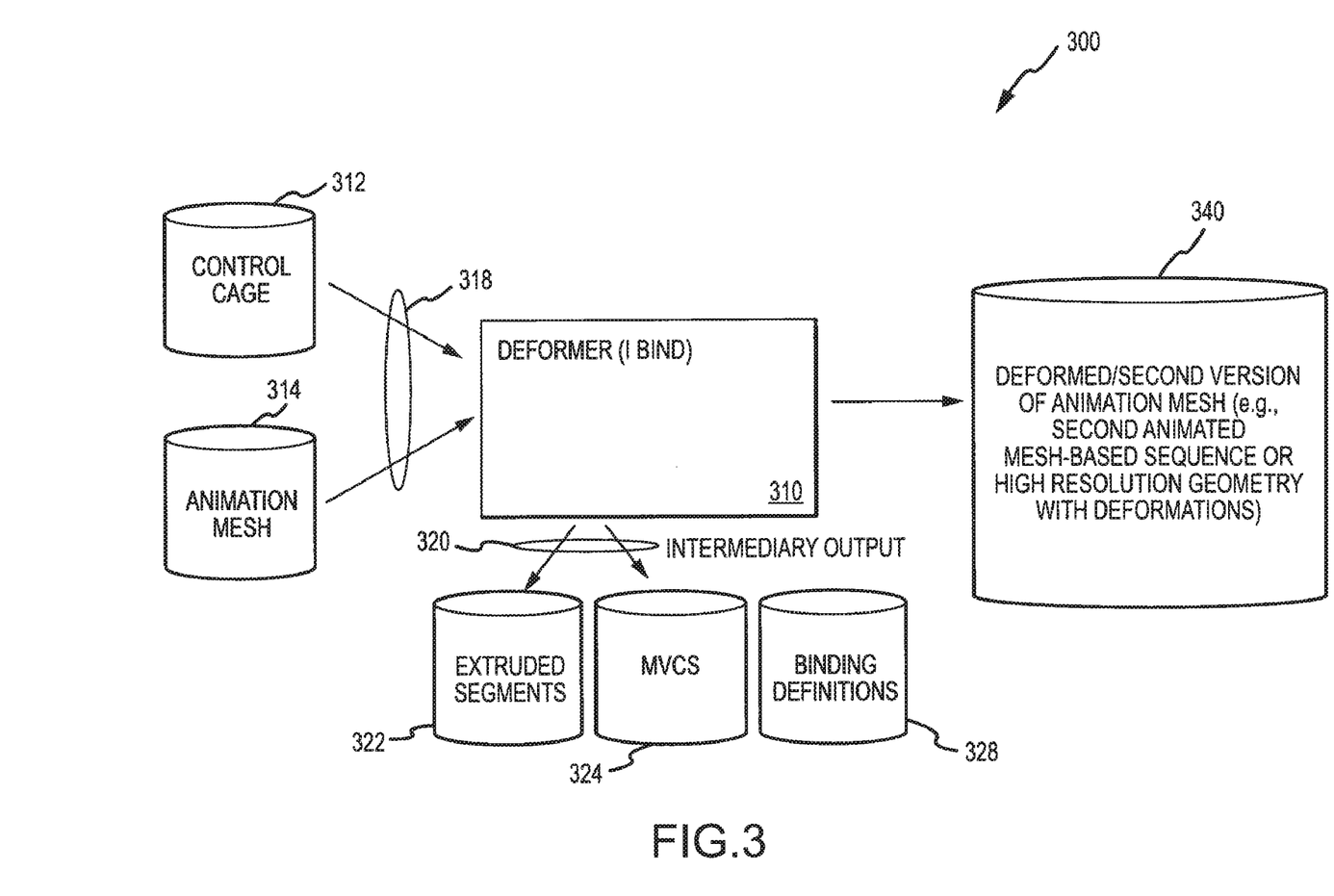
FIG. 3 is a schematic or functions drawing of a deformer application or module implemented with one or more microprocessors to generate a deformed version of an animation mesh (or second animation sequence from a first animation sequence in some cases) using the smooth, indirect binding techniques including use of segmented thin-layers and heat diffusion.

The iBind algorithm or process is a technique to use a low resolution control cage to deform a high resolution model. FIG. 3 shows this process in a schematic or functional block form. As shown, a system 300 is provided that may be used to deform a high resolution model, and the system 300 may be a computer-based system with one or more processors that transform data stored in memory/memory structures to provide a deformed high resolution 3D model. As shown, for example, a computer system 300 may include a deformer 310 that utilizes iBind. The deformer 310 takes as input 318 an animation mesh or high resolution model 314 and also a control cage 312 for the animation mesh 314. As intermediate output 320, the deformer 310 such as via operation of the iBind module(s) uses the control cage 312 to generate extruded segments 322 that provide segmented thin layers for each control face of the control cage 312. Also, the deformer 310 computes MVCs 324 for each control face of the cage 312, and then the deformer 310 may act to generate a set of binding definitions 326 that define how the control cage 312 corresponds to the animation mesh 314. The deformer 310 may then use the control cage 312 with binding to the animation mesh 314 to produce a deformed/second version of the animation mesh 340 (e.g., a second animated mesh in a different position or with deformations (of skin or the like) or a second animated mesh-based animation sequence or the like).

Figure 4:
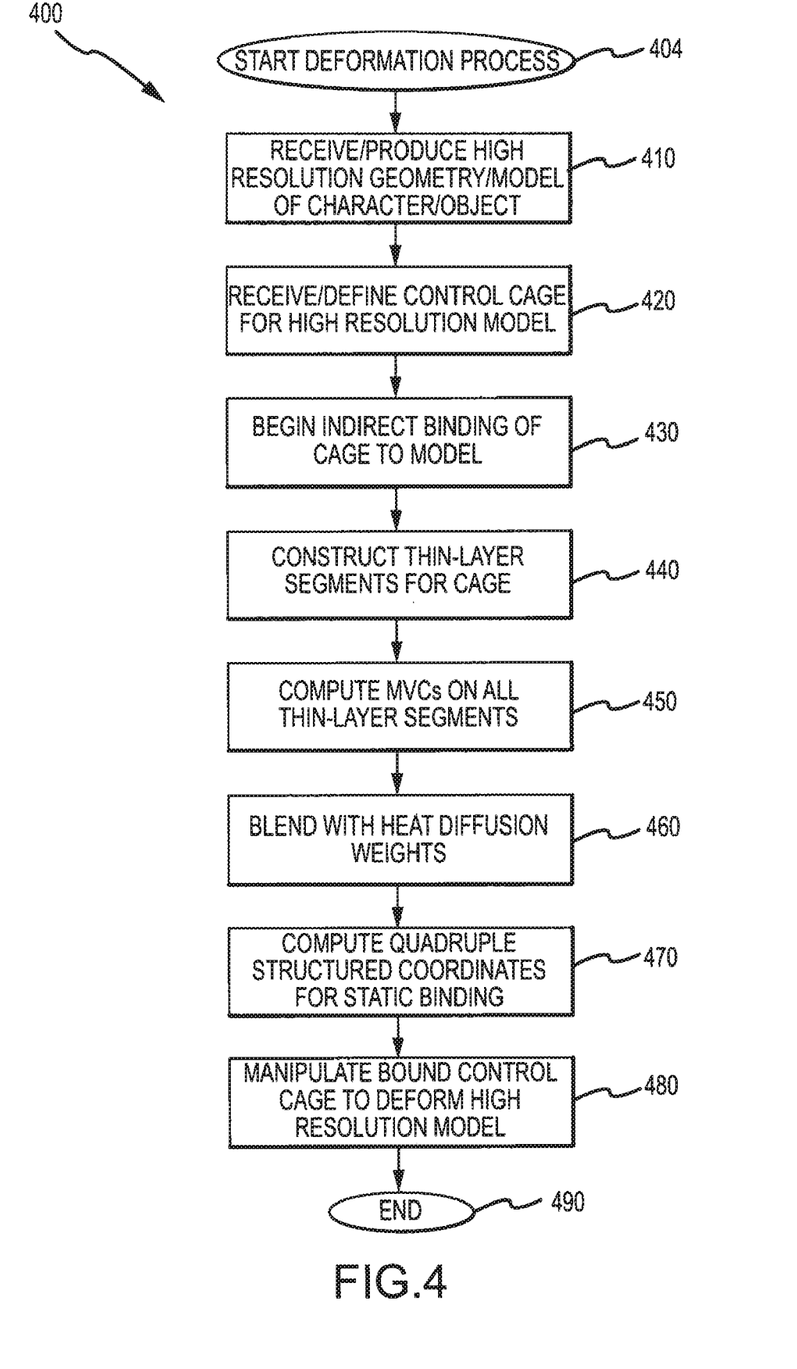
FIG. 4 illustrates a flow diagram of a deformation process according to an embodiment of the invention that utilizes indirect binding and that may be carried out by operation of the systems of FIGS. 1-3 or other devices.
Figure 5:
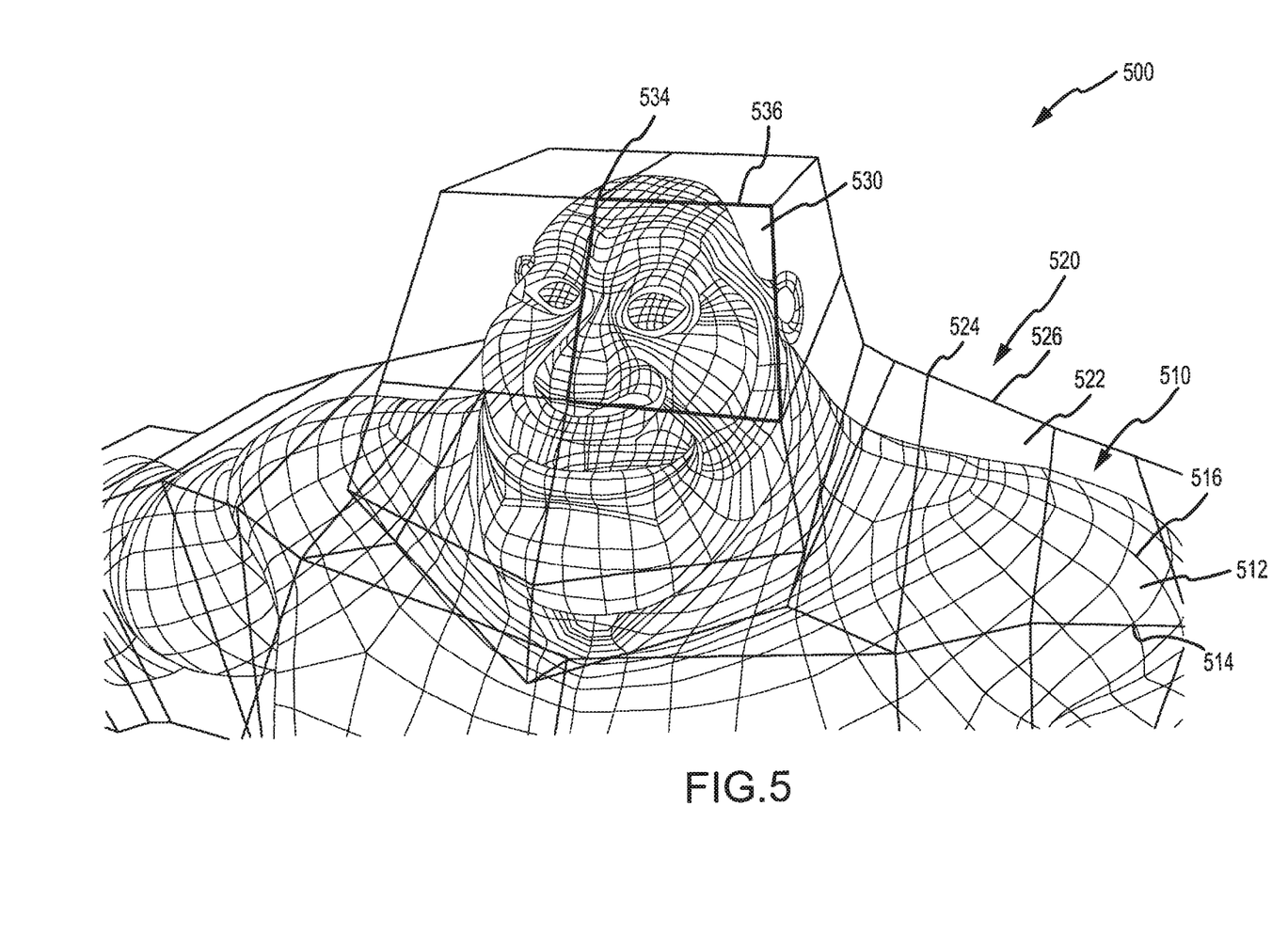
FIG. 5 illustrates a screen shot of a monitor of a computer graphics systems showing a 3D model/animation mesh with a control cage and showing a highlighted control face of the control cage.

With the above overview of the indirect binding techniques and systems for implementing such techniques understood, it may now be useful to provide a detailed description of an embodiment of the indirect binding method along with representative examples of its implementation to bind a cage to an animation mesh or high resolution model and to provide deformation of the model after binding is completed. FIG. 4 illustrates a model deformation process 400 that starts at 404 such as with providing a computer system that is adapted for running the software/code providing iBind and associated processes. At 410, the method 400 includes producing or receiving a high resolution model or geometry of a character or other object to be animated/deformed in process 400. With reference to FIG. 1, the 3D model generator module 132 may be used to generate such a model 152. FIG. 5 illustrates, for example, a high resolution model or animation mesh 510 that may be provided that represents a character for use in a piece of animation. The model 510 is defined by or includes model faces 512 that are each defined by model vertices 514 and model edges 516.

At step 420, the method 400 continues with defining or receiving a control cage for the high resolution model, with an exemplary cage 520 shown in FIG. 5 for the model 510 (and this step may be performed by use of control cage module 134 of FIG. 1 to create a cage 154 with control faces 158). The control cage 520 is lower resolution mesh than model/animation mesh 510 that includes a plurality of control faces 522 that are defined by a plurality of control vertices 524 and control edges 526. The method 400 continues at 430 with beginning the indirect binding process or algorithm to bind the model 510 to the control cage 520 (such as by calling/executing indirect binding application 140 shown in FIG. 1 as part of animation application 130).

The binding process may be started by requesting that an operator accept default parameters or enter user input to set binding parameters. For example, extrusion or layer thickness may be uniform in some binding processes and set at a default value or be user adjusted (e.g., with a general goal being to have the extrusion thickness cause local model vertices to fall or be located within a thin layer but this is not required and another goal is to use relatively thin layers). In other examples, the user/operator at 430 may be able to select a uniform extrusion thickness or depth or be able to have some or all the thicknesses be adaptive (e.g., see FIG. 9 and corresponding discussion).

Figure 6:
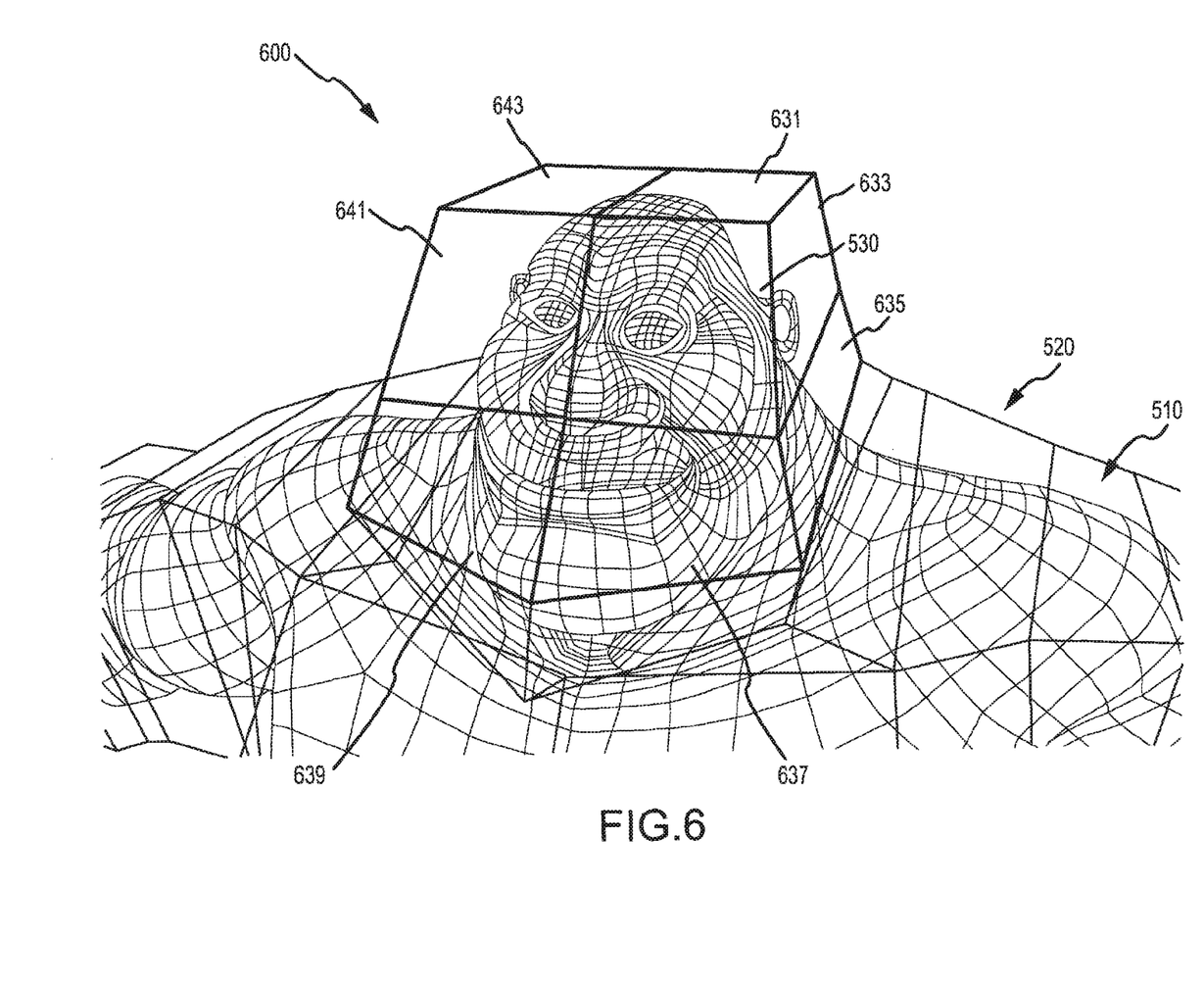
FIG. 6 illustrates a screen shot similar to FIG. 5 showing the control face being extended to surrounding/contacting control faces to define a control face set.
Figure 7:
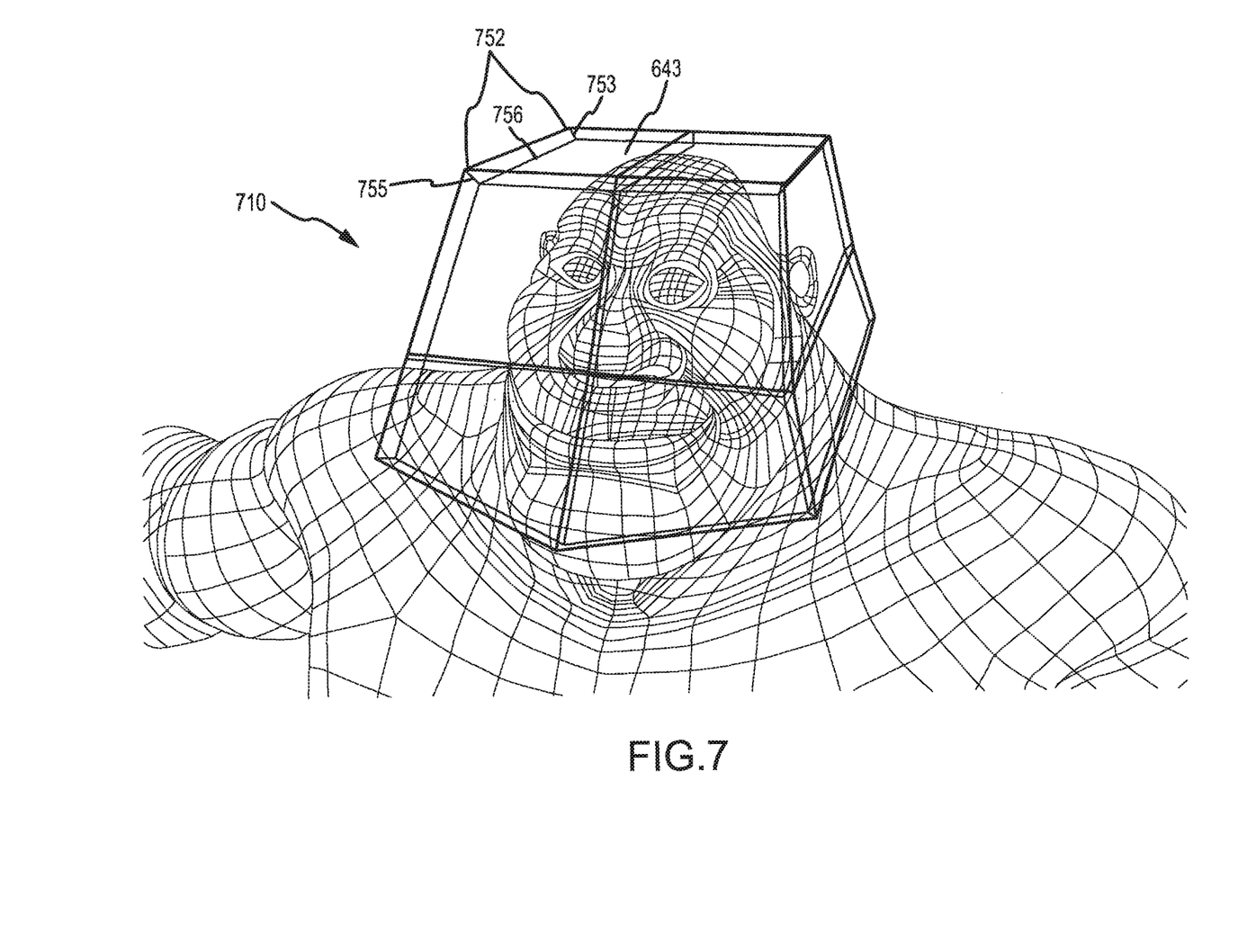
FIG. 7 illustrates a screen shot similar to FIGS. 5 and 6 showing extruding of the control face set to generate or define a thin-layer segment for the particular control face of the control cage.

At 440, the method 400 continues with constructing thin-layer segments for the control cage 520 (such as via use of thin-layer segment module 142 of binding application 140 in system 110 shown in FIG. 1). More particularly, a thin-layer segment is constructed for each control face 522 on the control cage 520. For example, FIGS. 5-7 illustrate creation of a thin-layer segment for a particular control face 530 of cage 520, with face 530 being defined by a number of control vertices 534 and control edges 536 (four each in this case, but the number of either vertices and edges is not a limitation of the invention). The control face 530 may be considered a seed face of a thin-layer segment being formed for the cage 520 (e.g., the segment may be referred to as being the segment seeded at the control face 530).

As shown in FIG. 6, the step 440 of method 400 continues with extending the control face set to include the surrounding control faces. The control face set is defined as including all adjacent or surrounding control faces that abut or are in contact with the seed control face 530. In the example of FIG. 6, the surrounding control faces for seed face 530 include face 631 (which abuts/contacts a control edge), face 633 (which abuts/contacts a control edge), face 635 (which contacts a control vertex), face 637 (which abuts/contacts a control edge), face 639 (which contacts a control vertex), face 641 (which abuts/contacts a control edge), and face 643 (which contacts a control vertex). Next, as shown in FIG. 7, the thin-layer segment 710 is formed by extruding the control face set along the control vertex normal direction toward the inside of the control cage (toward model 510) to form the thin-layer segment 710.

The segment 710 is a closed polygonal mesh due to the nature of its construction process. The segment 710 is shown to be extruded for face 643 from control vertices 752 to an extrusion depth or thickness as shown at edges 753, 755 and a connecting edge 756 may be extended between these vertices. Similar extrusion at each portion of the control face set produces the thin-layer segment 710 (e.g., a thin layer provided adjacent the faces of the control face set proximate to or overlapping with the high resolution model 510).

Figure 8:
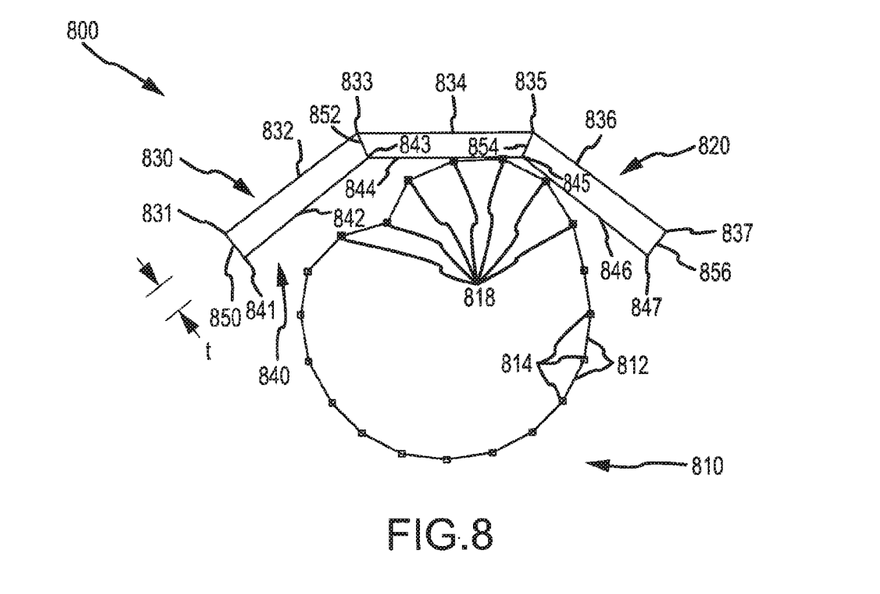
FIG. 8 illustrates a sectional view of a thin-layer segment for a control face of a cage and a corresponding portion of an animation mesh/high resolution geometry or model showing use of a single extrusion distance or depth for generating the thin-layer segment.

FIG. 8 illustrates an example of a high resolution model 810 defined in part by a mesh of model edges 812 and model vertices 814. A control cage 820 may be provided for the model 810 that is defined in part by control vertices 831, 833, 835, 837 and control edges 832, 834, 836 extending between these vertices. A thin-layer segment 830 may be formed using the cage 820 and an extrusion thickness, t, as shown with extruded vertices 841, 843, 845, 847 and edges 842, 844, 846, 850, 852, 854, and 856 between the extruded vertices and the original control vertices of the cage 820.

In the embodiment shown in screen shot 800 (e.g., of a graphics system monitor 120 as shown in FIG. 1), the distance, t, of extrusion may be uniform such that all control vertices 831, 833, 835, 837 are extruded the same distance. Also, in some cases, the extrusion distance or thickness, t, may be controlled or set by users/operators of the iBind application via a control panel/UI or the like. In a typical implementation, it may be desirable to extrude to a depth, t, to form a segment 830 that encapsulates "local" model vertices 818 that the segment 830 may be deforming (e.g., the thin-layer segment is used to define deformation of the model 810 by movements of vertices 818 or the like). The term "local" with regard to vertices is described further below. In other implementations, though, the thin-layer segment 830 may not encapsulate the vertices 818 (as is shown in FIG. 8), and this is acceptable, in part, because the MVCs that will be calculated on the segment 830 are smooth even when the model vertices 818 are not encapsulated by the segment 830.

Figure 9:
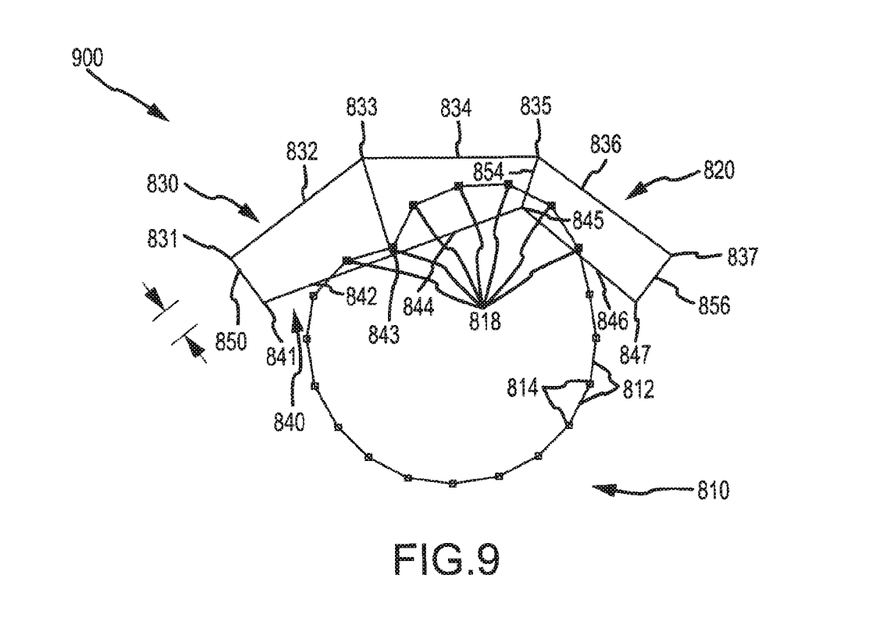
FIG. 9 illustrates a sectional view of a thin-layer segment similar to that show in FIG. 8 but with an adaptive rather than uniform extrusion distance for control vertices.

FIG. 9 illustrates with screen shot 900 another implementation or use of the thin-layer segment 830 in which distance, t, for extrusion is not uniform. For example, the distance, t, may be adaptive within the thin-layer segment module/algorithm so that each segment 830 acts to encapsulate all or a portion (e.g., as much as practical/possible) of the model vertices 818 for the section or portion of the model 810 that it is being used to deform/control. As shown in FIG. 9, each of the control vertices 831, 833, 835, 837 is extruded a different distance, t, to internal vertices 841, 843, 845, 847, respectively, in order to encapsulate the "local" model vertices 818 that this segment 830 is going to deform.

In general, a motivation for constructing a thin-layer segment (such as segment 710 or 830) is to allow each segment to deform only nearby model vertices. In this manner, the number of coordinate values needed to be stored for each model vertex may be reduced and better local control of the deformation may be achieved with the iBind application. Note, each segment may be overlapped with neighboring thin-layer segments, which may provide a smooth transition of deformation over the plurality of thin-layer segments created for a control cage.

With the thin-layer segments (such as segments 160 in FIG. 1) formed in step 440, the method 400 may continue at 450 with the computing of MVCs on all thin-layer segments. This step may be performed with the system 110 of FIG. 1 using MVC computation module 144 of iBinding application 140 to produce and store MVC values 164. Mean value coordinates or MVCs may be computed for the thin-layer segments such as segment 710 in a variety of ways that are known to those skilled in the art. For example, MVCs may be computed for the thin-layer segments at 450 using the algorithm, or a similar one, described in "Mean Value Coordinates for Closed Triangular Meshes" by Ju, T., Schaefer, S., and Warren, J. published in SIGGRAPH 2005 (e.g., at pages 561-566), which is incorporated herein in its entirety by reference.

In step 450, the MVCs may be computed only for the model vertices that are located near the seed face of a segment. The set of model vertices, V, that will be deformed by a segment, S, may be determined in the next step 460 by using a heat-diffusion-based weighting technique. In other words, the segment, S (such as segment 710 shown in FIG. 7), may be used as a control cage to deform the set of model vertices in the set V using the MVC method/technique. MVCs are computed at 450 for the set of model vertices, V, with respect to the segment control cage, S (such as segment 710 and other thin-layer segments that would be generated in step 440 for cage 520, which is associated with 3D model or animation mesh 510).

In practice or implementation of the iBinding process, each model vertex may have multiple thin-layer segments associated with it because multiple nearby segments may have influence on the model vertex. In other words, a model vertex is typically affected only by thin-layer segments nearby and, therefore, affected only by control vertices nearby in the original control cage. The MVCs for these nearby thin-layer segments are blended together in the next step 460 to generate a Combined Segment MVC or CSMVC, which, in turn, is used at runtime to evaluate the final position of the deformation.

The method 400 may continue at 460 with blending the MVCs with heat diffusion weights, such as by operation of the heat diffusion blend module 146 of the iBind application 140 of system 110 in FIG. 1. Heat diffusion weights (as with MVCs) may be computed in a variety of ways to practice the method 400 and step 460. For example, the heat diffusion weights may be computed using the algorithm (or a similar algorithm) described in "Automatic Rigging and Animation of 3D Characters" by I. Baran and J. Popovic, published in SIGGRAPH 2007, which is incorporated herein by reference in its entirety. However, the Baran and Popovic technique may be modified to perform step 460. For example, instead of putting a heat source at each bone of a skeleton, the heat source may be placed or positioned at a center or similar location of each control face of a control cage that is used to form thin-layer segments.

Figure 10:
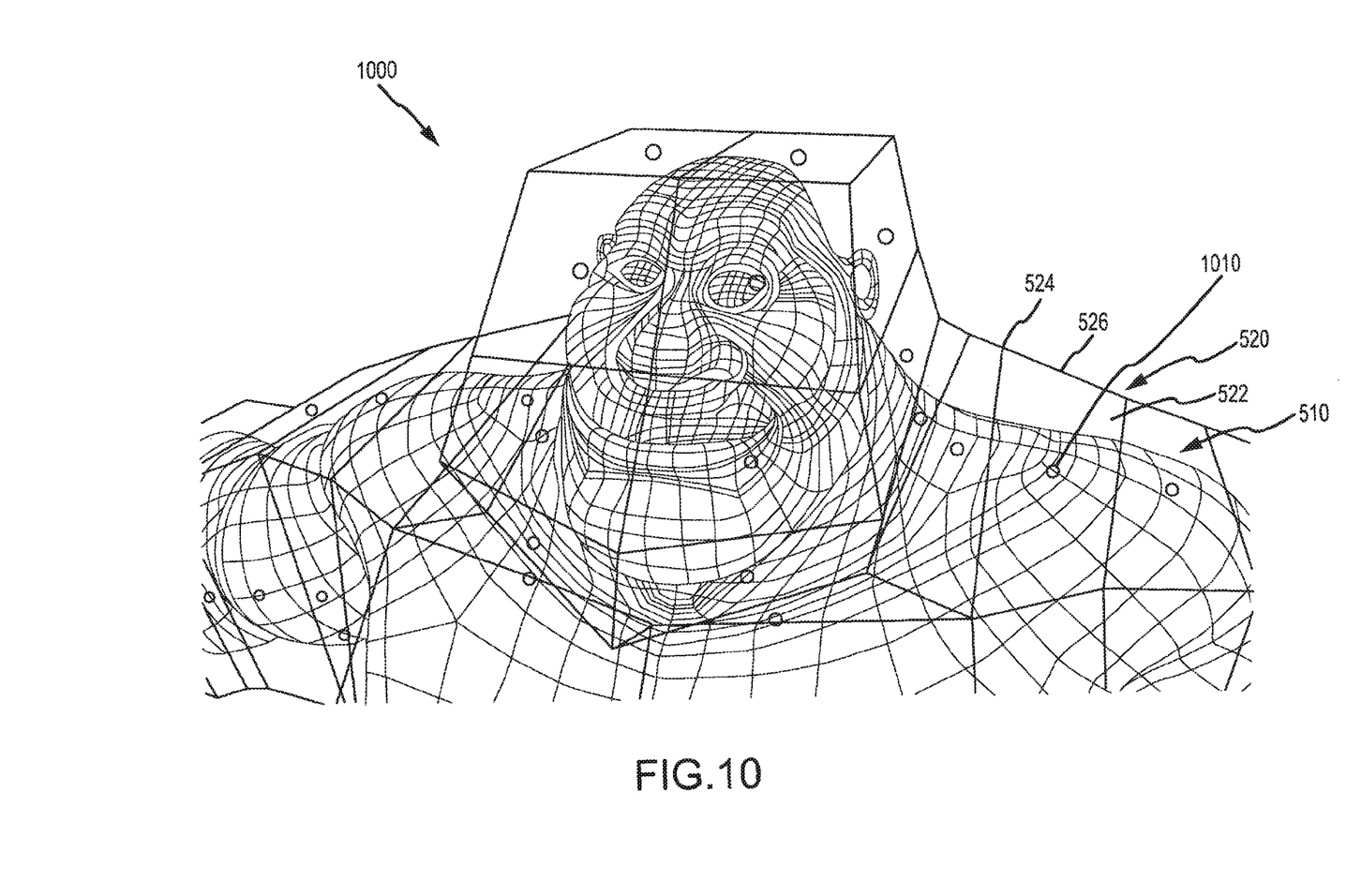
FIG. 10 illustrates use and positioning of heat sources at centers of each control face of a control cage as part of blending with heat diffusion weights to provide a desired binding of a control cage to an animation mesh.

FIG. 10 illustrates a screen shot 1000 showing the high resolution model 510 and the control cage 520 for the model 510. As shown, a plurality of heat sources 1010 is positioned on the cage 520 such that each control face 522 has a centrally-located heat source 1010. Then, the step 460 may involve solving for heat equilibrium over the surface of the high resolution model to provide a heat diffusion result. A model vertex on the model surface will have some heat values or heat amounts, which may be treated as weights, from multiple nearby heat sources 1010. For example, a model vertex, v, has some heat h(v,i) from the heat source located at the center of a control face, i. All the heat amounts on a model vertex, v, are normalized so that they sum up to 1. For example, h(v,i) may be the normalized heat of model vertex, v, from the heat source located at the center of control face i. Then, h(v,i) may be used as the weight that determines how much influence the model vertex, v, got or received from the segment that was "seeded" at control face, i.

A model vertex, v, will typically be considered as "local" to the segment seeded at the control face, i, if h(v,i) is greater than 0. That means if a vertex is getting some influence from a segment then it is considered to be "local" to the segment. The normalized heat diffusion weight, h(v,i), is also used to blend the MVCs of model vertex, v, from multiple segments. The following equation may be used in such blending:

$$\hat{f}[v] = \sum_i h_i \left( \frac{\sum_j w_{ij} f_j}{\sum_j w_{ij}} \right)$$

In this equation, h(v,i) is abbreviated as $h_i$, which is multiplied by the MVC interpolant (as shown in the Baran and Popovic technique). In the blending equation, f[v] is the interpolant of the heat diffusion/blending method or step 460 of method 400. Basically, the interpolant is the weighted sum of all the multiple MVCs on model vertex, v. The weight, $h_i$, is used to scale the MVC from segment, i. By multiplying $h_i$ with $w_{ij}$, the "combined segment MVC" (CSMVC) is used, and the CSMVC may be used at runtime to evaluate the interpolant.

At this point in the discussion, it may be useful to provide further explanation of the use of heat diffusion, with regard to step 460, with initial consideration of heat diffusion skinning. Generally, a goal of skinning or skin attachment is to assign weight values to each vertex of a skinned character. A skinned character has joints and a skin, and the joints make the skin move around. A weight value for a vertex (of the skin) indicates how much influence a joint has on that vertex. The weight value may in some cases be any value in the range [0,1], with a value of 1 meaning complete influence while a value of 0 meaning none or no influence. Most vertices are influenced by multiple joints, and, hence, each vertex should have a weight for each of its influencing joints (e.g., if a vertex A is influenced by K joints, it should have K weights). For skinning to look natural in a deformation, the sum of the "K" weights for each vertex preferably sum to 1 (or a number/value near 1).

Normally, skin weights for a vertex are computed by examining the "K" (user-defined) nearest bones and computing the distance to each bone. The distances are normalized, such that their sum is equal to 1. These normalized distance values become the skin weights for that vertex. When one applies weights in this way, the results are acceptable but not necessarily very good because results may be unnatural in areas where bones meet and improper relationships can be formed between bones and vertices (e.g., a hand joint that may happen to be located near the hip may accidently be considered an influence to the joint area vertices). The skin weight computation is normally performed only once, and once computed, these weights are fixed as the joints move around.

Heat diffusion takes a different approach to computing skin weights. Skin weights are based upon the proximity of bones and a diffusion equilibrium equation over the mesh. One may imagine that each bone is dissipating heat to the mesh vertices. Vertices that are close to the bone will be hotter than those farther away, and the bone heat sets the initial hotness of each vertex (note, in practice, vertices far away from a bone receive no heat contribution). Heat diffusion on a surface indicates that the heat entering each vertex should be the same as the heat leaving each vertex. If there is only one bone and every vertex is equidistant to the bone, then the hotness values will be same at equilibrium.

As an example, three vertices (A, B, and C) may have initial hotness or heat values of one. In this case, the vertices (A, B, and C) may be adjacent vertices in a 3D model and all have equal hotness values. Each of these vertices (A, B, and C) may, for example, be connected to two other vertices. Then, since vertex A is connected to two vertices, half of the heat will go to B and the other half to another unseen vertex. The same can be said of vertex C. The sum of the heat from vertex A and vertex C towards vertex B is 1, and vertex B's heat value is 1 such that it is at equilibrium.

Now, if the heat at vertex B is increased to a higher value, the system will not be at equilibrium. For example, the initial hotness/heat value at vertex A may be 1, at vertex B be 2, and at vertex C be 1. To achieve equilibrium, the hotness values have to be adjusted such as by applying weight values to each vertex (e.g., 1*wA, 2*wB, 1*wC). For example, if wA was 1, wC was 1, and wB was 0.5, then the system would be back at equilibrium. If there are multiple bones, then each vertex could possibly be heated by multiple bones. If that is the case, then the initial hotness value of each vertex is not the same and, instead, varies across the surface. If that is the case, a set of weights is computed that balances out the system of vertices. Again, this computation computes one set of weights for one bone. Thus, for each bone, a set of weights of each bone is computed, and this results as a set of "k" bone weights for each vertex. Note also that the above case is simple in that it assumes that heat dissipates evenly between adjacent vertices and each bone contributes some heat to each vertex but, this is not the case typically as heat varies according to curvature and some vertices are not affected by all bones (e.g., especially if the bones are far away). The heat diffusion process ensures vertices are heated only by bones that the vertices surround. This is currently done by computing the visibility of the bone to the vertices. If the view of the bone is obstructed (e.g., by other surfaces), then those vertices are not heated by that bone. Hence, the end bones of the fingers will not affect all physically adjacent vertices. For example, the pinkie bone will affect only the vertices of the pinkie, not the vertices of the other fingers such that initial hotness values are simply computed by pure distance.

Now, with reference to FIG. 4, method 400 including step 460 differs, in part, because there are no bones. iBind applications including blending with heat diffusion weights as shown as step 460 may create imaginary bones points and uses the bone points to set an initial heat value on the mesh (e.g., inside the control cage). Heat diffusion then is used to compute a weight value for each vertex to each imaginary bone. These weights are then used to control how much influence each thin-layer segment has on nearby vertices of a high resolution model.

Referring again to FIG. 4, the method 400 continues at step 470 with computing (such as with module 148 of the iBind application 140 of system 110 in FIG. 1) the quadruple structured coordinates (e.g., coordinates 172 stored in memory 150) for use in static binding. In the preceding discussion, it was explained how the CSMVC were computed for a model vertex, v. In the following discussion, step 470 (or the iBind application in general) is explained with relation to computing Quadruple Structured Coordinates (QSCs) for static binding.

Specifically, before the low resolution control cage may be utilized to deform a high resolution model (provided or received at step 410), the model has to be bound to the control cage. Typically, there are two different ways that a high resolution model can be bound to a low resolution control cage: static binding and dynamic binding. A coordinate (for example, an MVC or a CSMVC) for each model vertex is computed when the binding is performed. Then, at runtime, when the control cage is modified/manipulated, the coordinate together with the new configuration of the control cage (i.e., new/modified positions of control vertices on the control cage) is used to evaluate the deformed position for the model vertex using the interpolant equation described above with relation to blending using heat diffusion (or step 460 in method 400).

In static binding, the coordinate is computed at the binding time when the low resolution control cage and the high resolution model are in a so-called binding pose. Note that the control cage at the binding pose may be referred to as the "base" control cage and the control cage at run time may be referred to as the "deformed" control cage. Usually, the binding pose is the pose where most of the vertices are exposed nicely and the meshes are smooth without any self intersection. For example, a da Vinci pose of a humanoid character model is usually a good pose for binding. With static binding, any change in the input model at runtime will not affect the final result of deformation because the final result depends only on the coordinate computed at binding time and the "deformed" control cage.

In dynamic binding, the coordinate is computed at runtime using the latest input model and the "base" control cage. The computation of the coordinate is a very time-consuming process. Therefore, dynamic binding is very slow compared to static binding. With dynamic binding, any change in the input model at runtime affects the final result of the deformation because the coordinate is recomputed with the latest input model. However, the result might not be what users want because as the input model is changed the model vertex might be bound to the wrong place in the control cage.

With an understanding of the shortcomings of both the existing static binding and dynamic binding approaches, the method 400 may utilize a new Quadruple Structured Coordinates (QSC) for use during static binding (e.g., step 470 of method 400). The use of QSCs makes use of the benefits of static binding in that it binds at the desired binding pose and it binds only once at the binding time. Also, step 470 may be performed to allow any change in the input model to be reflected in the final deformation result, which is the advantage that dynamic binding has.

Briefly, a QSC may be made up of or include four CSMVCs. One CSMVC is for the model vertex, v, and the rest for three points ($v_x$, $v_y$, & $v_z$) away from v along Cartesian X, Y & Z axes with a small delta distance, $\triangleq$. At runtime, the interpolant equation is evaluated on v, $v_x$, $v_y$, & $v_z$ and the deformed positions f[v], f[$v_x$], f[$v_y$] & f[$v_z$] are computed. Three vectors are computed: (f[$v_x$]−f[v]), (f[$v_y$]−f[v]), and (f[$v_z$]−f[v]). These three vectors can be used as the three column vectors in an approximated Jacobian Matrix of the CSMVC deformation space. This approximated Jacobian Matrix can then be used to transform any change in the input model on vertex, v, to the space defined in the "deformed" control cage. The following equation describes the calculation of final deformation result using QSC:

$$g[v] = \frac{\eta[v] - v}{\delta} \{\hat{f}[v + \delta e_x] - \hat{f}[v] \cdot \hat{f}[v + \delta e_y] - \hat{f}[v] \cdot \hat{f}[v + \delta e_z] - \hat{f}[v]\} + \hat{f}[v]$$

In the above equation, g[v] is the final deformed output position of the model vertex, v, and $\approx$ [v] is the input position of v at run time. In the equation, v is the input position of v at binding time and $\triangleq$ is the delta distance between v and the delta points. Additionally, in the equation, $e_x$, $e_y$, & $e_z$ are the unit vectors along X, Y & Z axis. So, $v_x = v + \triangleq e_x$, $v_y = v + \triangleq e_y$, $v_z = v + \triangleq e_z$. {f[v+$\triangleq$ $e_x$]−f[v], f[v+$\triangleq$ $e_y$]−f[v], f[v+$\triangleq$ $e_z$]−f[v]} is the approximated Jacobian Matrix of the CSMVC deformation space. The method 400 may continue at 480 with a user manipulating the control cage to deform the high resolution model that has now been statically bound to the cage, and this equation is used computing the input change vector on model vertex, v, normalizing the vector with respect to unit $\triangleq$, transforming the vector by the approximated Jacobian Matrix, and then finally translating the vector with the deformed position of v,f[v] as part of step 480. The method 400 then ends at step 490.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed. As will be appreciated, the use of segmented thin-layers with QSCs overcomes many of the drawbacks associated with the MVC binding techniques. For example, the local influence of the control cage may be defined explicitly by allowing variable expansion of the surrounding face segments in conjunction with heat diffusion settings. As another example, control cages with open holes may be handled elegantly and result in smooth deformations. Also, the memory footprint is dramatically reduces, and runtime performance scales well to real world examples/applications. Additionally, use of the iBind application resolves numeric instabilities found in co-planar conditions, without requiring special case barycentric coordinates. The thin-layer extrusion stage checks for and simply avoids such conditions.

The iBind application is efficient, stable, and practical. It adds predictability to geometric lattice deformations, and it also allows the incoming vertex position to change freely while staying statically bound. The iBind application's static binding is faster, uses less memory, and is more effective than dynamic binding of MVCs (e.g., may be thirty times faster than dynamic binding due in part to the isolated segment approach).

We claim:

1. A computer-implemented method for use in animating an object, comprising:
    providing a three-dimensional, high-resolution model of the object in memory;
    providing a control cage for the high resolution model, wherein the control cage comprises a plurality of control faces each defined by a number of control vertices;
    with a microprocessor, generating a thin-layer segment for each of the control faces including extruding a set of the control vertices a distance toward the high resolution model; and
    with a microprocessor, binding the control cage to the high resolution model based on the generated thin-layer segments,
    wherein the extrusion distances are set such that the thin-layer segments each encapsulate at least one of vertex in a proximate portion of the high resolution model.

2. The method of claim 1, wherein each of the thin-layer segments comprises a mesh corresponding to a set of the control faces contacting the control vertices of a seed one of the control faces.

3. The method of claim 1, wherein, in the generating step, the control vertices are extruded along a normal relative to an adjacent one of the control faces.

4. The method of claim 1, further comprising with a microprocessor, computing mean value coordinates for each of the thin-layer segments and using the mean value coordinates to define the binding of the control cage to the high resolution model.

5. The method of claim 4, further comprising with a microprocessor, determining heat diffusion weights for each of the thin-layer segments using a heat diffusion model process and positioning heat sources at central locations of the control faces of the control cage.

6. The method of claim 5, further comprising manipulating the control cage to deform the high resolution model, wherein the deforming comprises repositioning at least a number of vertices of the high resolution model based on the heat diffusion weights and the mean value coordinates for the thin-layer segments.

7. The method of claim 5, wherein the binding further comprises defining a quadruple structure coordinate for the high resolution model and using the heat diffusion weights and the quadruple structure coordinates to deform the high resolution model in response to a manipulation of the control cage.

8. A computer system, comprising:
    a processor;
    memory structures storing an animation mesh;
    memory structures storing a control cage surrounding the animation mesh;
    a binding application executed by the processor performing a static binding of the control cage to the animation mesh based on generating a plurality of thin-layer segments that are each associated with a face of the control cage;
    a heat diffusion module executed by the processor determining influence weights associating the control cage to the animation mesh based on the thin-layer segments; and
    an animation module executed by the processor deforming the animation mesh based on manipulation of the control cage and the influence weights;
    wherein the generating of the thin-layer segments comprises identifying for each of the faces of the control cage a number of contacting ones of the faces in the control cage and extruding associated vertices of the control cage inward an extrusion distance toward the animation mesh,
    wherein the extrusion distances are set such that the thin-layer segments each encapsulate at least one of vertex in a proximate portion of the animation mesh.

9. The system of claim 8, wherein the binding application computes mean value coordinates (MVCs) for a set of vertices of the animation mesh located proximate to the associated one of the faces for each of the thin-layer segments.

10. The system of claim 9, wherein the set of vertices for which the MVCs are computed includes all of the vertices having a non-zero value for the influence weight as determined by the heat diffusion module.

11. The system of claim 8, wherein the animation module uses each of the thin-layer segments as a control cage for manipulating a set of vertices of the animation mesh with a position proximate to the thin-layer segment and having a non-zero influence weight.

12. The system of claim 8, wherein the binding application further operates to determine quadruple structured coordinates for each model vertex based on mean value coordinates for the thin-layer segments and wherein the animation module determines the deformation of the animation mesh at least in part based on the determined quadruple structured coordinates.

13. A non-transitory computer readable medium for use in deforming 3D models of objects, comprising:
    computer readable program code causing a computer to receive an animation mesh including a plurality of model vertices;
    computer readable program code causing the computer to receive a control cage associated with the animation mesh and comprising a plurality of faces;
    computer readable program code causing the computer to perform static binding of the control cage to the animation mesh including computing a coordinate for each of the model vertices based on applying a heat diffusion model to the control cage including positioning a heat source at a central position of each of the control faces; and
    computer readable program code causing the computer to deform the animation mesh in response to manipulation of the control cage including determining deformed positions based on the coordinates computed in the static binding,
    wherein for each of the control faces a thin-layer segment is generated and the static binding includes determining a set of local ones of the model vertices associated with each of the thin-layer segments and computing the coordinates for the set of local model vertices for use in the determining of deformed positions,
    wherein each of the thin-layer segments comprises a segmented volume defined by extruding from vertices of adjoining ones of the control faces about a seed one of the control faces an extrusion distance toward the animation mesh, wherein the extrusion distances are set such that the thin-layer segments each encapsulate at least one of vertex in a proximate portion of the animation mesh.

14. The computer readable medium of claim 13, wherein the coordinates comprise combined mean value coordinates determined for one of the thin-layer segments formed for each of the control faces.

15. The computer readable medium of claim 14, wherein mean value coordinates are determined for each of the thin-layer segments for a number of proximate model vertices having a non-zero heat value relative to the seed one of the control faces.

16. computer readable medium of claim 15, wherein the coordinates applied during static binding further comprise quadruple structured coordinates for each of the model vertices of the animation mesh including a combined one of the mean value coordinates associated with the model vertex.

* * * * *

UNITED STATES PATENT AND TRADEMARK OFFICE
CERTIFICATE OF CORRECTION

| | | |
|---|---|---|
| PATENT NO. | : 8,345,044 B2 | Page 1 of 1 |
| APPLICATION NO. | : 12/612081 | |
| DATED | : January 1, 2013 | |
| INVENTOR(S) | : Chung-An Lin et al. | |

It is certified that error appears in the above-identified patent and that said Letters Patent is hereby corrected as shown below:

Column 18, Claim 16, Line 4-8
Please replace Claim 16 with the following rewritten claim:

16. --The computer readable medium of claim 15, wherein the coordinates applied during static binding further comprise quadruple structured coordinates for each of the model vertices of the animation mesh included a combined one of the mean value coordinates associated with the model vertex.--

Signed and Sealed this
Sixteenth Day of April, 2013

Teresa Stanek Rea
*Acting Director of the United States Patent and Trademark Office*